(12) United States Patent  (10) Patent No.: US 9,103,707 B2
Fisher  (45) Date of Patent: Aug. 11, 2015

(54) METHOD AND SYSTEMS FOR ESTIMATING A FUEL LEVEL OF A LIQUID NATURAL GAS STORAGE CONTAINER

(71) Applicant: General Electric Company, Schenectady, NY (US)

(72) Inventor: Kevin Michael Fisher, North East, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/973,002

(22) Filed: Aug. 22, 2013

(65) Prior Publication Data

US 2015/0057845 A1    Feb. 26, 2015

(51) Int. Cl.
| | |
|---|---|
| *B65G 67/18* | (2006.01) |
| *G01F 17/00* | (2006.01) |
| *G01F 23/00* | (2006.01) |
| *G01F 25/00* | (2006.01) |
| *B61C 17/02* | (2006.01) |

(52) U.S. Cl.
CPC ............... *G01F 17/00* (2013.01); *B61C 17/02* (2013.01)

(58) Field of Classification Search
USPC .............. 701/19–20, 104–105; 246/108–109; 105/1.4, 26.05
See application file for complete search history.

(56) References Cited

U.S. PATENT DOCUMENTS

| | | | |
|---|---|---|---|
| 6,564,172 B1 * | 5/2003 | Till .............................. | 702/182 |
| 7,974,774 B2 * | 7/2011 | Kumar ......................... | 701/123 |
| 2005/0068184 A1 * | 3/2005 | Kane et al. .................... | 340/576 |
| 2007/0137514 A1 * | 6/2007 | Kumar et al. ............... | 105/26.05 |
| 2011/0257869 A1 * | 10/2011 | Kumar et al. ................. | 701/103 |
| 2012/0085260 A1 | 4/2012 | Nichini et al. | |
| 2012/0090729 A1 | 4/2012 | Nichini et al. | |
| 2013/0311066 A1 * | 11/2013 | Guimaraes et al. ........... | 701/104 |

* cited by examiner

*Primary Examiner* — Yonel Beaulieu
(74) *Attorney, Agent, or Firm* — GE Global Patent Operation; John A. Kramer

(57) ABSTRACT

Various methods and systems are provided for modifying a fuel volume of a fuel container based on fuel consumption. In one embodiment, a method comprises storing an initial fuel volume measurement for a fuel container of a first rail vehicle and modifying the initial fuel volume measurement based on fuel consumption of an engine of a second rail vehicle to determine a modified fuel volume.

20 Claims, 3 Drawing Sheets

METHOD AND SYSTEMS FOR ESTIMATING A FUEL LEVEL OF A LIQUID NATURAL GAS STORAGE CONTAINER

FIELD

Embodiments of the subject matter disclosed herein relate to rail vehicles. Other embodiments relate to fuel tenders for rail vehicles.

BACKGROUND

Locomotives (or other vehicles) typically include a prime mover that is powered by a fuel source to generate mechanical energy. In one example of a locomotive, mechanical energy generated by the prime mover may be converted to electrical energy that is used to power traction motors and other components and systems of the locomotive. In some examples, the prime mover may be a combustion engine that is fueled by diesel, gasoline, or other liquid petroleum distillates. In other examples the engine may additionally or alternatively utilize a gaseous fuel, such as natural gas.

In light of its favorable energy content, liquefied natural gas (LNG) may be used as a fuel source for a locomotive prime mover. Particularly for long-haul applications, it may also be desirable to utilize a fuel tender for carrying one or more LNG storage tanks. The fuel tender may be coupled to the locomotive prime mover. Prior to injection into a locomotive's natural gas-fueled engine, LNG is typically vaporized into gaseous natural gas (CNG).

In one example, a fuel level of an LNG storage tank on the fuel tender may be determined using a bubbler method wherein vaporized LNG within the fuel container is used to make CNG that is bubbled in the LNG storage tank. The fuel level is then determined based on the gas pressure of the bubbled vapor. A fuel volume may then be determined based on the fuel level and a geometry of the LNG storage tank. However, when the prime mover is moving, the fluid level in the LNG storage tank may not be consistent, thereby reducing the accuracy of the fuel level and fuel volume measurements. As a result, measuring the fuel level in this way may only be accurate when the fuel tender is stationary or has been stationary for a duration. Inaccurate fuel level and fuel volume measurements may result in degradation of LNG usage control leading to LNG supply issues.

BRIEF DESCRIPTION

In one embodiment, a method comprises storing an initial fuel volume measurement for a fuel container of a first rail vehicle and modifying the initial fuel volume measurement based on fuel consumption of an engine of a second rail vehicle to determine a modified fuel volume.

In one example, the initial fuel volume measurement may only be stored when the first rail vehicle and the second rail vehicle are stationary. As a result, the accuracy of the stored initial fuel volume measurement may increase over a condition wherein the first and second rail vehicles are moving. Then, during engine operation, the initial fuel volume is modified based on fuel consumption of the engine. As a result, an estimate of the fuel volume of the fuel container may be continually updated, thereby increasing the accuracy of fuel volume measurements displayed to a rail vehicle operator and optimizing refueling of the rail vehicles.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
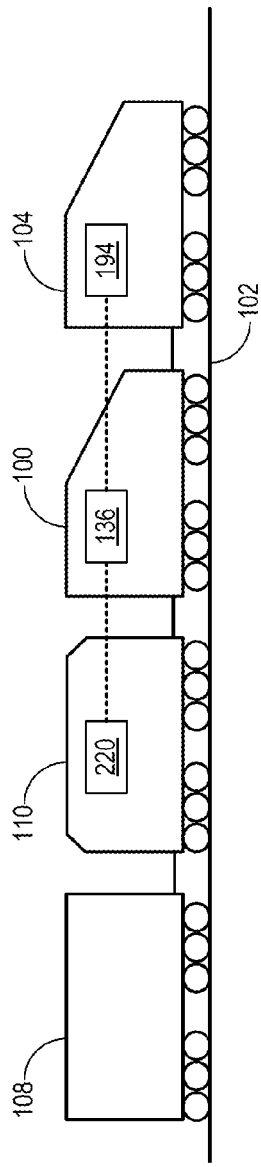
FIG. 1 shows a schematic diagram of two locomotives, a fuel tender, and a freight car according to an embodiment of the invention.
Figure 2:
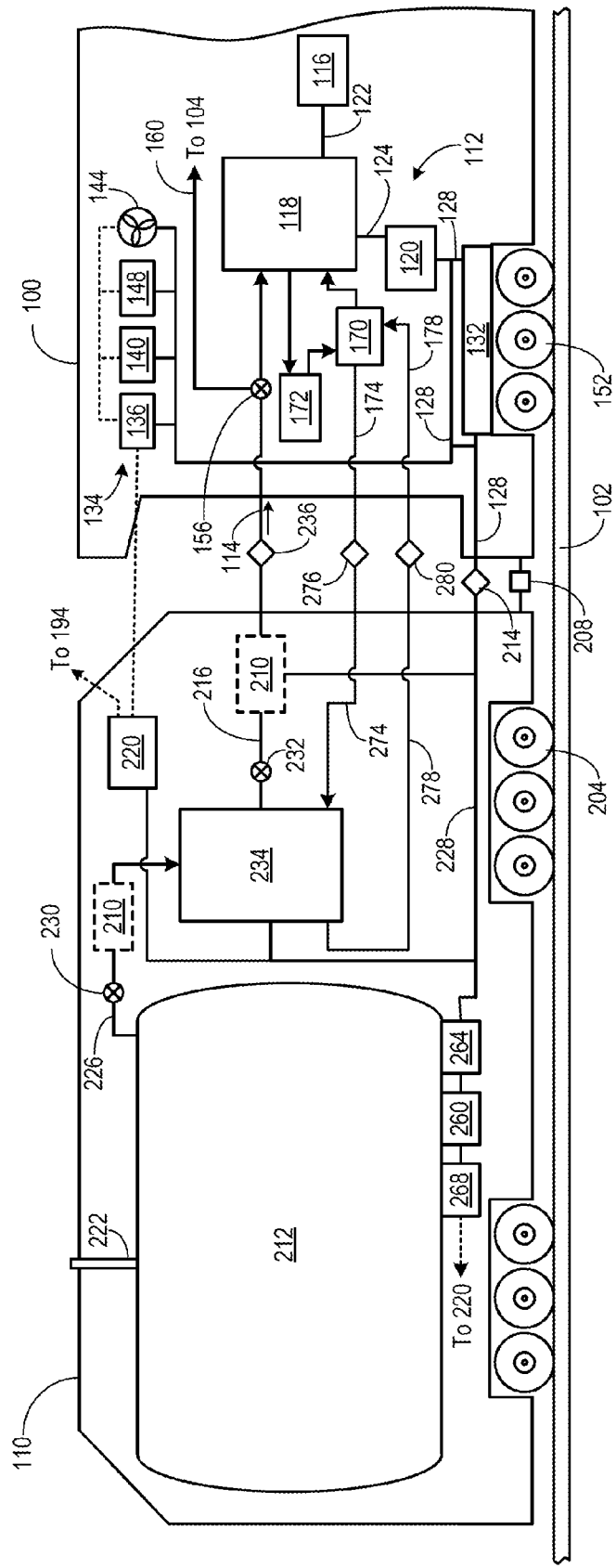
FIG. 2 shows a schematic diagram of an example fuel tender and natural gas-fueled locomotive according to an embodiment of the invention.

The following description relates to various embodiments of methods and systems for determining a modified fuel value of a fuel container. In one example, the fuel container is stored on a first rail vehicle coupled to a second rail vehicle, the second rail vehicle including a controller. In another example, the fuel container may be a liquid natural gas fuel container on a fuel tender, the fuel tender coupled to a rail vehicle (such as a locomotive), as shown in FIGS. 1-2. The value may include a fuel level, fuel volume, or fuel mass of the fuel container. In one example, the fuel volume may be based on a fuel level measurement and a geometry of the fuel container. In this example, the fuel volume measurement may be sent to a locomotive controller of the rail vehicle. When the rail vehicle is stationary, a fuel volume measurement received from the fuel tender may be stored in the locomotive controller of the rail vehicle. Then, during engine operation when the rail vehicle is moving, the stored fuel volume may be modified based on fuel consumption of the engine of the rail vehicle. A method for storing, modifying, and updating the stored fuel volume measurement is presented at FIG. 3. FIG. 4 shows examples of storing and modifying the stored fuel volume measurement based on fuel consumption. Modifying the stored fuel volume measurement based on fuel consumption may increase an accuracy of the fuel volume measurement and subsequently increase control of refueling the fuel container.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for determining a modified fuel volume of a fuel container, an example of a rail vehicle including one or more fuel tenders is disclosed. For example, FIG. 1 shows a schematic diagram of a consist of vehicles including a first locomotive 100, a second locomotive 104, a fuel tender 110, and a freight car 108. Specifically, FIG. 1 shows the first locomotive 100 removably coupled to the second locomotive 104 and removably coupled to the fuel tender 110 according to the present disclosure. The fuel tender 110 is shown removably coupled to a freight car 108. It will be appreciated that additional fuel tenders, freight cars, locomotives, and/or other railroad vehicles may also be removably connected to the freight car 108 and/or the second locomotive 104. It will also be appreciated that the order of the various railroad vehicles shown in FIG. 1 may be modified. For example, FIG. 1 shows the second locomotive 104 as the lead vehicle of the consist and the freight car 108 as the trail vehicle. However, in other embodiments the first locomotive 100 may be the trail vehicle. In yet another example, the first locomotive 100 may be the lead vehicle with the fuel tender 110 coupled between the first locomotive 100 and the second locomotive 104. In this example, the fuel tender 110 provides CNG, as described further below, to both the first locomotive 100 and the second locomotive 110. In some embodiments, the fuel tender 110 may send CNG directly to the first locomotive 100 through a first fluidic coupling and send CNG directly to the second locomotive 104 through a second fluidic coupling.

The first locomotive 100, the second locomotive 104, the fuel tender 110, and the freight car 108 are configured to run on a rail 102 (or set of rails) via a plurality of wheels. In FIG. 1, the fuel tender 110 is positioned behind the first locomotive 100 and removably connected to the freight car 108. In other configurations, the fuel tender 110 may be positioned in front of the locomotive 100 and/or may not be connected to the freight car 108 or other rail car. In still other configurations, one or more other rail cars may be located between the fuel tender 110 and the first locomotive 100. In yet another configuration, the fuel tender 110 may be located between the first locomotive 100 and the second locomotive 104.

In one example the first locomotive 100 and second locomotive 104 are powered for propulsion, while the fuel tender 110 and freight car 108 are non-powered. It will be appreciated that in other examples one or more of the fuel tender 110 and freight car 108 may also be powered for propulsion by, for example, one or more traction motors.

Additionally, FIG. 1 shows a tender controller 220 on board the fuel tender 110, a first locomotive controller 136 on board the first locomotive, and a second locomotive controller 194 on board the second locomotive. As described further below, the first locomotive controller 136 controls operation of the primary engine 118 and the tender controller 220 controls operation of the fuel tender 110. However, the first locomotive controller 136 may send signals and/or requests (e.g., commands) to the tender controller 220 regarding operation of the fuel tender 110. For example, the first locomotive controller 136 may send a request to the tender controller 220 of the fuel tender 110 to convert liquid natural gas to gaseous natural gas and send the gaseous natural gas via one or more fuel lines to an engine of the first locomotive 100, as described further below. Further, the first locomotive controller 136 may include instructions stored thereon (e.g., within a memory of the controller) for sending a plurality of requests to the tender controller 220 and to components on board the fuel tender 110. The tender controller 220 may then control actuators and/or components on board the fuel tender 110 based on the requests sent from the first locomotive controller 136 on board the first locomotive 100. As shown in FIG. 1, the tender controller 220, first locomotive controller 136, and second locomotive controller 194 all communicate electronically with one another.

Turning now to FIG. 2, the first locomotive 100 includes an engine system 112 that comprises a primary engine 118 having a plurality of cylinders. The primary engine 118 may be referred to herein as the locomotive engine. In one embodiment, each cylinder is configured to have at least one gaseous fuel injector and at least one liquid fuel injector. In the depicted example, first locomotive 100 is configured as a locomotive powered by engine system 112 that operates with various fuels, such as a first fuel and a second fuel. The fuels may include a liquid fuel, such as diesel fuel, an alternative fuel, and/or a gaseous fuel, or combinations thereof. In one example, the primary engine 118 is a dual fuel engine, such as a gas turbine, compression ignition engine, or spark ignition engine, a first fuel is gaseous natural gas that is received from the fuel tender 110 via a gaseous natural gas (CNG) fluidic coupling 114 (e.g., fuel line), and a second fuel is diesel fuel received from a diesel storage tank 116 via a fluidic coupling 122 on board the first locomotive 100. While engine system 112 is configured in one embodiment herein as a multi-fuel engine operating with diesel fuel and natural gas, in other examples engine system 112 may use various combinations of fuels other than diesel and natural gas.

The primary engine 118 is configured to generate a torque that is transmitted to a power conversion unit 120 along a drive shaft 124. The power conversion unit 120 is configured to convert the torque into electrical energy that is delivered via electrical bus 128 to at least one traction motor 132 and to a variety of downstream electrical components in the first locomotive 100. Such components may include, but are not limited to, compressors 140, blowers 144, batteries 148, an electronics control system 134 comprising one or more controllers 136, shutoff valves, pressure regulators, radiators, lights, on-board monitoring systems, displays, climate controls (not shown), and the like. The electrical bus 128 further delivers electrical energy to the fuel tender 110.

Based on the nature of the generated electrical output, the electrical bus 128 may be a direct current (DC) bus (as depicted) or an alternating current (AC) bus. In one example the power conversion unit 120 includes an alternator (not shown) that is connected in series to one or more rectifiers (not shown) that convert the alternator's electrical output to DC electrical power prior to transmission along the electrical bus 128. The alternator may include, for example, a high-speed generator, a generator machine whose stator flux is synchronous to the rotor flux, or an asynchronous machine.

Based on the configuration of a downstream electrical component receiving power from the electrical bus 128, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The traction motor 132 receives electrical power from the power conversion unit 120 and is coupled to one or more axles/driving wheels 152. In this manner, the traction motor 132 is configured to drive the axles/driving wheels 152 along the rail 102. It should be appreciated that the number of sets of axles/driving wheels 152 may vary, and that one or more traction motors 132 may be provided for each set of axles/driving wheels 152. The traction motor 132 may be an AC motor. Accordingly, an inverter paired with the traction motor 132 may convert DC input to an appropriate AC input, such as a three-phase AC input, for subsequent use by the traction motor. In other non-limiting embodiments, traction motor 132 may be a DC motor directly employing the output of the power conversion unit 120 after rectification and transmission along the DC bus 128.

One example locomotive configuration includes one inverter/traction motor 132 pair per axle/driving wheel 152. Traction motor 132 may also be configured to act as a generator providing dynamic braking to brake the first locomotive 100. In particular, during dynamic braking, the traction motor may provide torque in a direction that is opposite from the rolling direction, thereby generating electricity that is dissipated as heat by resistors (not shown) connected to the electrical bus 128.

The first locomotive controller 136 on board the first locomotive 100 controls the primary engine 118 by sending commands to various engine control hardware components such as invertors, alternators, relays, fuel injectors, fuel pumps (not shown), or the like. As described further below, in one example, the first locomotive controller 136 also monitors locomotive operating parameters in active operation, idle, and shutdown states. Such parameters may include, but are not limited to, manifold air temperature (MAT), ambient temperature, engine oil temperature, compressor air pressure, main air reserve pressure, battery voltage, a battery state of charge, brake cylinder pressure, or the like. The first locomotive controller 136 further includes computer readable storage media (not shown) including code for enabling on-board monitoring and control of rail vehicle operation.

The first locomotive controller 136, while overseeing control and management of the primary engine 118 and other locomotive components, may be configured to receive signals from a variety of engine sensors, as further described herein. The first locomotive controller 136 may utilize such signals to determine operating parameters and operating conditions, and correspondingly adjust various engine actuators to control operation of the first locomotive 100. For example, the first locomotive controller 136 may receive signals from various engine sensors including, but not limited to, engine speed, engine load, boost pressure, exhaust pressure, ambient pressure, exhaust temperature, manifold pressure (MAP), or the like. Correspondingly, the first locomotive controller 136 may control the first locomotive 100 by sending commands to various components such as traction motors, alternators, cylinder valves, throttles, or the like. As described further below, the first locomotive controller 136 at least partially controls operation of the fuel tender by sending commands (e.g., requests) to the tender controller 220 on board the fuel tender. For example, the commands sent to the tender controller 220 may include commands for controlling various components on board the fuel tender such as a vaporizer 234, a pump 210, a LNG storage tank 212, or the like. In another example, the commands sent to the tender controller 220 may include requests for CNG (e.g., a request to send CNG to the first locomotive 100). Then, in response to the request for CNG, the tender controller 220 may adjust one or more of the vaporizer 234, the pump 210, and/or one or more valves controlling flow of LNG and/or CNG in order to deliver the requested CNG to the first locomotive 100.

In some examples, the vaporizer 234 may be referred to as a regasification unit. For purposes of this description, an "on-board" component, device or other structure means that the component or device is physically located on the vehicle being described. For example, with respect to the fuel tender 110, a component or structure physically located on the fuel tender is on board the fuel tender, including when the fuel tender is coupled to a locomotive or other rail vehicle and when the fuel tender is not coupled to a locomotive or other rail vehicle.

In one example, the computer readable storage media configured in the first locomotive controller 136 may execute code to auto-stop or auto-start the primary engine 118 by enabling, for example, an Automatic Engine Start/Stop (AESS) control system routine. As discussed in more detail below, the first locomotive controller 136 also communicates with the tender controller 220 on board the fuel tender 110 to, for example, request delivery of gaseous natural gas for the primary engine 118. As shown in FIGS. 1-2, the first locomotive controller 136 also communicates with the second locomotive controller 194 in the second locomotive 104 to, for example, coordinate pass-through delivery of gaseous natural gas from the fuel tender 110 to a natural-gas fueled engine in the second locomotive 104. The computer readable storage media configured in the first locomotive controller 136 may execute code to appropriately transmit and receive such communications.

With continued reference to FIG. 2, the fuel tender 110 is removably coupled to the first locomotive 100 and includes axles/wheels 204 configured to travel along rail 102. In the depicted example, the fuel tender 110 includes six pairs of axles/wheels 204. In another example, the fuel tender 110 includes four pairs of axles/wheels 204. The fuel tender 110 further includes a mechanical coupling mechanism 208 that removably couples the fuel tender to the first locomotive 100 for linked movement thereof. In other examples, the fuel tender 110 may include a second coupling mechanism (not shown) that may removably couple the fuel tender to another rail vehicle, such as the freight car 108 or an additional locomotive (e.g., such as the second locomotive 104.

The fuel tender 110 is configured to carry one or more fuel storage tanks. In one embodiment, as shown in FIG. 2, the fuel tender 110 includes an on-board cryogenic LNG storage tank 212 for storing LNG. The LNG storage tank 212 is a fuel container wherein the fuel stored in the fuel container is LNG. In one example, the LNG storage tank 212 may take the form of a vacuum jacketed pressure vessel that stores LNG at pressures ranging from approximately 10 psi to approximately 130 psi. It will be appreciated that to maintain LNG in a liquid state, the LNG may be stored at a temperature range of approximately 4-80 degrees Celsius. In another example, the LNG may be stored at a temperature above or below the range of 4-80 degrees Celsius. In yet another example, the LNG may be stored at a temperature range of approximately 60-120 degree Celsius. In some examples, as shown in FIG. 2, the fuel tender 110 includes a cryogenic unit 268 for helping maintain the LNG within desired temperature and pressure ranges. In other example, the fuel tender 110 may not include the cryogenic unit 268. Even with efficient insulation and cryogenic refrigeration equipment, heat may leak into the LNG storage tank 212 and causes vaporization of portions of the LNG into boil-off gas.

It will also be appreciated that the LNG storage tank 212 may have various sizes and configurations and may be removable from the fuel tender 110. Further, as shown in FIG. 2, the storage tank 212 is configured to receive LNG from an external refueling station via port 222. In alternate examples, the storage tank 212 may revive LNG through another port or location on the storage tank 212.

The LNG storage tank 212 supplies LNG via cryogenic LNG fluidic coupling 226 and one or more valves 230 to a vaporizer 234. The vaporizer 234 converts the LNG into gaseous or compressed natural gas (CNG), or vaporizes the LNG, by the application of heat to the LNG. Specifically, the vaporizer 234 vaporizes the LNG to CNG by utilizing heated fluid supplied to the vaporizer 234. As shown in FIG. 2, heated fluid for the conversion of LNG to CNG is generated by a heat exchanger 170 positioned on the first locomotive 100. The heat exchanger 170 receives engine cooling water from a radiator 172. Engine cooling water from the primary engine 118 flows to the radiator 172 to be cooled and then sent back to the primary engine 118. Before the cooled engine cooling water flows back to the primary engine 118, the cooled engine cooling water passes through the heat exchanger 170 to heat a secondary fluid, or coolant. The coolant heated at the heat exchanger 170 then flows from the heat exchanger to the vaporizer 234 on the fuel tender 110 via heated coolant line 174 and heated coolant line 274. The heated coolant line 174 and the heated coolant line 274 are coupled together at a detachable interface coupling 276 that enables the fuel tender 110 to be decoupled from the first locomotive 100. Coolant then returns to the heat exchanger 170 via coolant line 278 and coolant line 178. The coolant line 278 and the coolant line 178 are coupled together at a detachable interface coupling 280 that enables the fuel tender 110 to be decoupled from the first locomotive 100. In alternate embodiments, heat may be supplied to the vaporizer 234 from an alternative source on board the first locomotive 100, another locomotive, and/or fuel tender. Further, additional and/or alternative liquid or gas sources may be used to provide heat to the vaporizer 234.

The CNG is then delivered to the primary engine 118 of the first locomotive 100 via to power the primary engine 118. As shown in FIG. 2, the CNG is delivered to the primary engine 118 via CNG fluidic coupling 216 and CNG fluidic coupling 114 and one or more control valves 232. In some examples, as shown in FIG. 2, a pass-through control valve 156 is provided to direct at least a portion of the CNG through the first locomotive 100 via a pass through fluidic coupling 160 to the second locomotive 104. In this manner, a natural gas-fueled engine in the second locomotive 104 may be powered by gaseous natural gas from the fuel tender 110. In alternate examples, there may not be a control valve 156 and CNG may only be delivered to the first locomotive 100. In yet another example, additional control valves may be positioned in the CNG fluidic coupling 114 to direct CNG to additional locomotives or rail cars. In some examples, additional control valves may be positioned in the CNG fluidic coupling 216 to direct CNG to additional locomotives or rail cars. For example, in an embodiment wherein the tender car 110 is positioned between the first locomotive 100 and the second locomotive 104, the tender car 110 may send CNG to the first locomotive and the second locomotive 104 through separate fluidic couplings. As such, the second locomotive 104 may receive CNG directly from the tender car 110 and not through another locomotive.

In a first embodiment, the LNG storage tank 212 may be a higher pressure LNG storage tank wherein the LNG is maintained at a pressure greater than a threshold supply pressure. In one example, the threshold supply pressure of CNG may be approximately 120 psi. The pressure within the LNG storage tank 212 may then be maintained above 120 psi (e.g., 160 psi) so the CNG arriving at the first locomotive 100 is at the threshold supply pressure. In other examples, the threshold supply pressure of CNG may be greater or less than 120 psi and the LNG storage tank pressure may be maintained at a level greater than the threshold supply pressure to account for any pressure losses in the CNG supply system. In this first embodiment, LNG is metered from the storage tank 212 and to the vaporizer 234 by the valve 230, or other metering device. CNG converted from the LNG at the vaporizer 234 then flows to the first locomotive 100 via the CNG fluidic coupling 114. The flow of CNG to the first locomotive is controlled or metered via the valve 232.

In a second embodiment, the LNG storage tank 212 may be a lower pressure LNG storage tank wherein the LNG is maintained at a pressure lower than the threshold supply pressure (e.g., less than 120 psi). For example, the LNG storage tank 212 may maintain the LNG at a lower pressure of 50 psi. In this embodiment, a pump 210 may be positioned in the LNG fluidic coupling 226 to control a flow (e.g., flow rate) of LNG to the vaporizer 234 and/or in the CNG fluidic coupling 216 to control a flow (e.g., flow rate) of CNG to the first locomotive 100. In alternate embodiments, the pump 210 may be positioned additionally or alternatively on the first locomotive 100.

The CNG fluidic coupling 114 further includes a detachable interface coupling 236 that enables the fuel tender 110 to be decoupled from the locomotive 100. It will also be appreciated that in other embodiments the pass-through control valve 156 may be located on board the fuel tender 110, along with suitable fluidic couplings to pass through fluidic coupling 160.

It will be appreciated that by converting the LNG to CNG on board the fuel tender 110 and supplying CNG to the primary engine 118, standard gaseous natural gas conduit and interface couplings may be utilized between the fuel tender and the locomotive 100. Advantageously, such a configuration avoids costly cryogenic tubing and interface couplings, and the corresponding design challenges, that would otherwise be required for transferring LNG between the fuel tender 110 and the locomotive 100. Additionally, using such standard, low pressure gaseous natural gas fluidic and interface couplings eliminates the possibility of LNG leaks between the fuel tender 110 and locomotive 100.

Components on the fuel tender 110 are powered with electrical energy from the first locomotive 100. Specifically, the electrical bus 128 is coupled to an electrical bus 228 at a detachable interface coupling 214. The detachable interface coupling 214 enables the fuel tender 110 to be decoupled from the first locomotive 100. The electrical bus 128 and the electrical bus 228 may be referred to herein as electrical energy lines. In one embodiment, the rail vehicle may include one or more electrical energy lines traversing a space between the first locomotive 100 and the fuel tender 110.

Electrical energy generated at the first locomotive 100 travels to the fuel tender 110 through the electrical bus 228. Components on board the fuel tender 110 receive electrical energy via the electrical bus 228. Such components may include, but are not limited to, the vaporizer 234, tender controller 220, control valves 230, 232, LNG tank pressure sensor 260, LNG tank temperature sensor 264, cryogenic unit 268, flow meters, ambient air temperature sensors, compressors, blowers, radiators, batteries, lights, on-board monitoring systems, displays, climate controls (not shown), and the like.

The tender controller 220 on board the fuel tender 110 controls and/or actuates various components on board the fuel tender 110, such as the vaporizer 234, cryogenic unit 268, control valves (e.g., valve 230 and valve 232), one or more pumps 210, and/or other components on board the fuel tender 110, by sending commands to such components. The commands sent by the tender controller 220 may be based on commands sent to the tender controller 220 from the first locomotive controller 136 on board the first locomotive 100. For example, the first locomotive controller 136 may send a request to the tender controller 220 to stop vaporizing LNG and thereby stopping the conversion of LNG to CNG. In response, the tender controller 220 may actuate the vaporizer 234 to turn off or stop vaporizing LNG.

The tender controller 220 may also monitor fuel tender operating parameters. Such parameters may include, but are not limited to, pressure and temperature of the LNG storage tank 212, a level or volume of the LNG storage tank 212, pressure and temperature of the vaporizer 234, ambient air temperature, and the like. In one example, the tender controller 220 may send a fuel value measurement measured at the LNG storage tank 212 to the first locomotive controller 136 on board the first locomotive 100.

It will be appreciated that the fuel tender 110 is not limited to the components shown in the example of FIG. 2 and described above. In other examples, the fuel tender 110 may include additional or alternative components. As an example, the fuel tender 110 may further include one or more additional sensors, flow meters, control valves, or the like.

The systems of FIGS. 1-2 provide for a system of mechanically coupled rail vehicles, comprising a first rail vehicle including a fuel container containing liquefied natural gas, a second rail vehicle having a multi-fuel engine, the second rail vehicle configured to fluidly and mechanically couple to the first rail vehicle, and a controller on board the second rail vehicle, the controller configured to store an initial fuel volume measurement for the fuel container of the first rail vehicle and modify the initial fuel volume measurement based on fuel consumption of an engine of the second rail vehicle to determine a modified fuel volume.

As discussed above, a fuel container may be located on a first rail vehicle while a second rail vehicle includes a multi fuel engine and an engine controller. The multi fuel engine may then use fuel from the fuel container to at least partially power the second rail vehicle. In one example, as shown at FIGS. 1-2, the first rail vehicle is the fuel tender 110, the second rail vehicle is the first locomotive 100, the fuel container is the LNG storage tank 212, the multi fuel engine is the primary engine 118, and the engine controller is the first locomotive controller 136.

In other embodiments, the LNG storage tank may be another type of fuel container located on a first rail vehicle. A second rail vehicle may include a multi fuel engine and an engine controller. The multi fuel engine may then use fuel from the fuel container to power the second rail vehicle.

Measurements of an amount (e.g., volume) or level of fuel in the fuel container may be taken at the fuel container on the fuel tender. Different procedures may be used to determine the fuel level at the fuel container. In one example, the method of measuring the fuel level of the fuel container may include a bubbler method. With the bubbler method, vaporized LNG within the fuel container is used to make CNG that is bubbled into a bottom of the fuel container via an air tube. A pressure gauge or sensor measures the air pressure in the air tube. The differential pressure between the air pressure in the air tube and the fuel container (e.g., tank) represents the pressure of the fluid column in the fuel container and is therefore proportional to the fluid level (e.g., depth of fluid) in the fuel container. Additionally, the fuel level may be based on a geometry of the fuel container. The geometry of the fuel container and the differential pressure may then be used to determine the fuel volume, or mass of fuel, of the fuel container. However, measuring the fuel volume in this way may only be accurate when the fuel tender is stationary or moving below a threshold speed and/or threshold acceleration. When the fuel tender is moving, the fluid level of the fuel container may not be consistent, thereby reducing the accuracy of the bubbler method fuel level measurement.

In alternate embodiment, the fuel volume of the fuel container may be determined using an alternate method such as an ultrasonic or float method. In both of these methods, the fuel volume measurement may still be inaccurate while the fuel tender and fuel container is in motion (e.g., the rail vehicle is moving).

During rail vehicle operation, fuel level, fuel volume, or fuel mass measurements of the fuel container taken on the fuel tender may be sent to a controller of a rail vehicle, such as the first locomotive controller 136 of the first locomotive 100 shown in FIGS. 1-2. In one example, the locomotive controller 136 may convert a fuel level measurement from the fuel tender to a fuel volume or fuel mass based on the geometry of the fuel container. In another example, the tender controller may determine the fuel volume or fuel mass in the fuel container and then send the fuel volume or fuel mass measurement to the locomotive controller. As used below, the fuel value or measurement sent from the fuel tender to the locomotive is a fuel volume of the fuel container. However, in alternate embodiments this fuel value may be any one of a fuel level, fuel volume, or fuel mass of the fuel container of the fuel tender.

In some examples, the fuel volume measurement may only be stored within the first locomotive controller when the first locomotive is stationary. Since the fuel tender is coupled to the first locomotive, the fuel tender is also stationary when the first locomotive is stationary. In other examples, the fuel volume measurement may only be stored within the first locomotive controller when a speed of the first locomotive is less than a threshold speed for a threshold duration. As a result, the fuel volume measurement stored within the first locomotive controller may have a higher level of accuracy. Fuel volume measurements measured on the fuel tender and received at the first locomotive controller when the first locomotive is moving may then be discarded and not stored within the controller.

During engine operation, when the rail vehicle (e.g., first locomotive) is moving, the stored fuel volume may be modified and updated based on fuel consumption of the engine (e.g., primary engine of the first locomotive). Specifically, as the engine of the rail vehicle consumes fuel, the amount (e.g., mass, volume, or the like) of CNG consumed may be subtracted from the stored fuel volume to determine a modified fuel volume of the fuel container. The amount of CNG consumed by the engine may be based on one or more of a fuel efficiency of the rail vehicle, the speed of the rail vehicle, a flow rate of fuel from the fuel container and into the engine of the rail vehicle, a total amount of energy in engine cylinders, and an energy contribution of natural gas in the engine cylinders. Further details on determining fuel consumption of the engine are discussed below with reference to FIG. 3.

A measurement of the volume of fuel inside the fuel container may affect engine operation of the first locomotive and/or the second locomotive and refueling of the fuel tender. For example, when the fuel volume reaches a lower threshold volume, refueling of the fuel container of the fuel tender may be required. Additionally, if the fuel volume reaches the lower threshold volume, the engine of the first locomotive may adjust the percentage of CNG used at the engine. Specifically, the engine of the first locomotive may consume a higher percentage of diesel fuel or other alternate fuel when the LNG fuel volume in the fuel container is low. As such, the locomotive engine may continue operating while waiting for refueling of the LNG fuel container. In another example, the locomotive controller may switch to receive its CNG supply from another fuel container (e.g., a second fuel container) in the consist when the fuel volume of a first fuel container decreases below the lower threshold volume. Further actions based on the fuel level measurement are discussed below with reference to FIG. 3.

In this way, a method may include receiving a fuel value measured at a fuel container on a fuel tender, storing the fuel value and a corresponding time stamp when a speed of a rail vehicle is below a threshold speed for a duration, and modifying the fuel value based on fuel consumption of an engine of the rail vehicle to determine a modified fuel value. The fuel value is one or more of a fuel level and an amount of fuel in the fuel container, the amount of fuel based on the fuel level and a geometry of the fuel container and the amount of fuel being one or more of a volume of fuel or a mass of fuel in the fuel container.

In one example, storing the fuel value and the corresponding time stamp includes storing the fuel value and a time at which the fuel value is received within a memory of a controller of the rail vehicle. The fuel value stored in the controller is an initial fuel value and the method further includes updating the initial fuel value stored in the controller when the speed of the rail vehicle decreases below the threshold speed for the duration. The method further includes storing the fuel value when the fuel value is received at a time when the rail vehicle is stopped. Modifying the fuel value then includes modifying the fuel value stored in a controller of the rail vehicle after the rail vehicle is re-started.

The method further includes displaying the modified fuel value to an operator of the rail vehicle. Additionally, modifying the fuel value based on fuel consumption includes subtracting a mass of fuel consumed by the engine since the time stamp from the fuel value and wherein the mass of fuel consumed by the engine is based on one or more of a fuel efficiency of the rail vehicle, a flow rate of fuel from the fuel container and into the engine, a total amount of energy in engine cylinders, and an energy contribution of natural gas in the engine cylinders.

Figure 3:
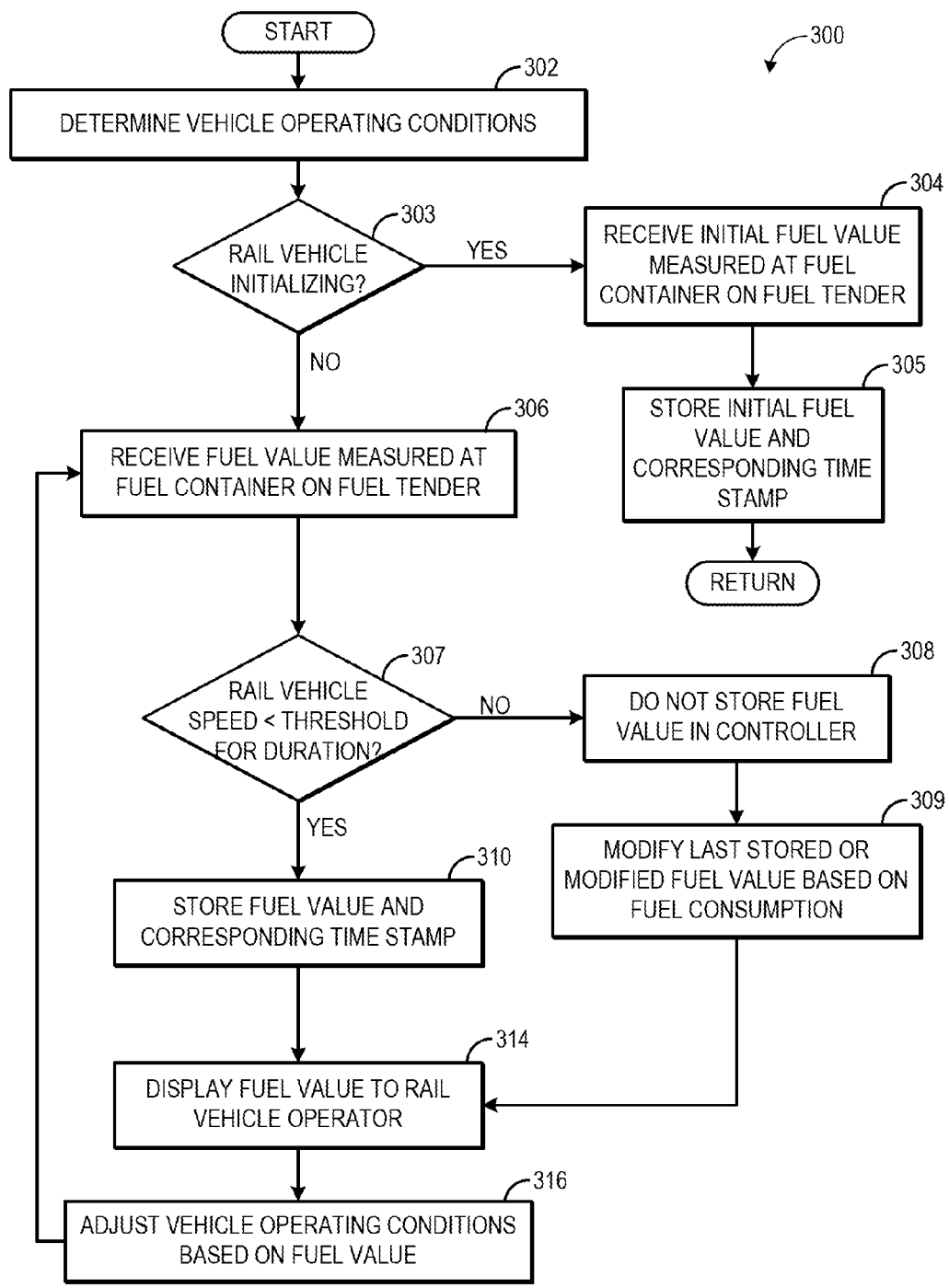
FIG. 3 shows a flow chart of a method for determining a modified fuel value of a fuel container based on engine operating conditions according to an embodiment of the invention.
Figure 4:
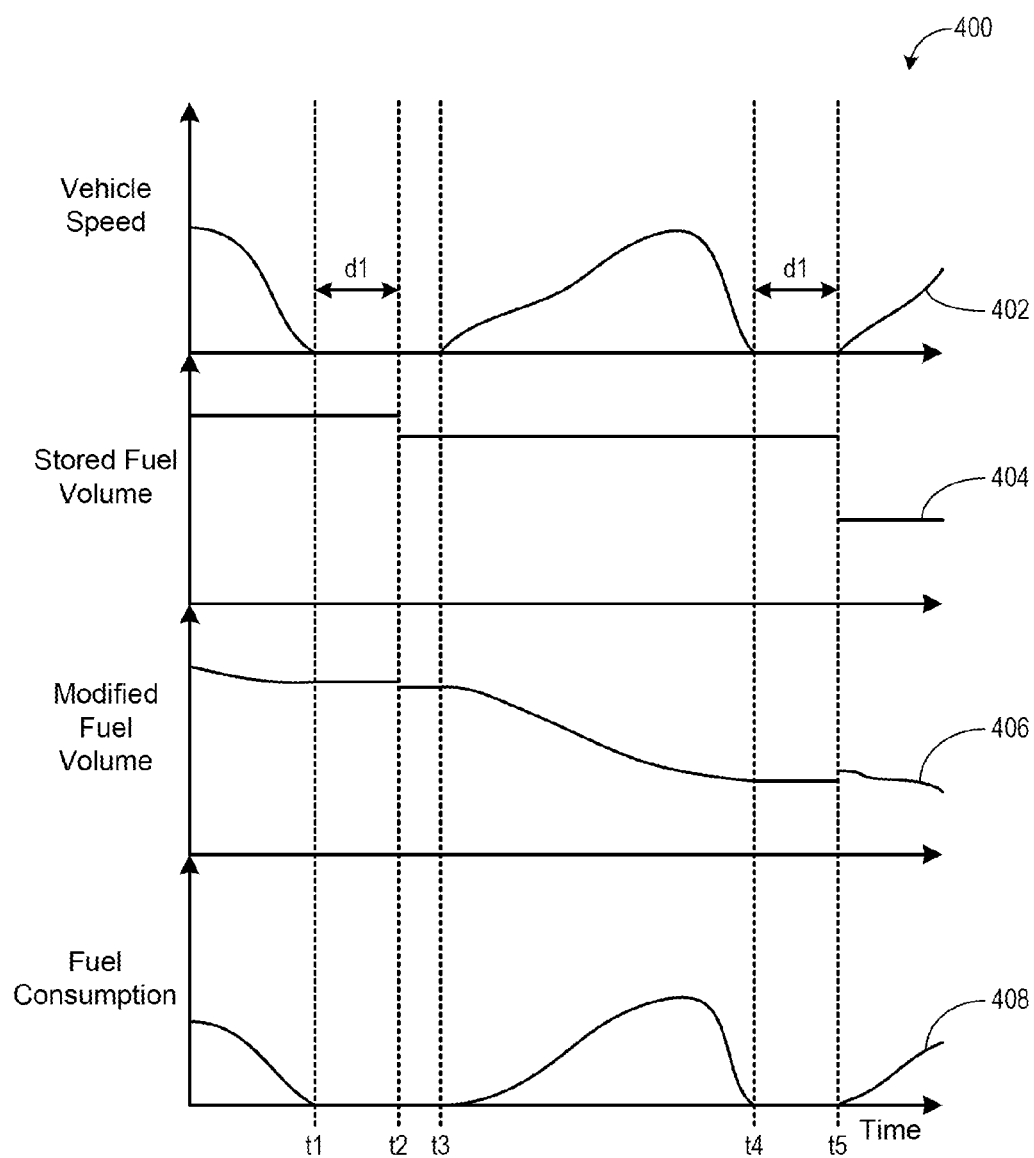
FIG. 4 shows a graphical example of storing and modifying a fuel volume of a fuel container based on fuel consumption of a locomotive engine according to an embodiment of the invention.

Turning now to FIG. 3, a method 300 is presented for determining a modified fuel volume of a fuel container based on engine operating conditions. In one example, instructions for executing the method 300 may be stored in a memory of a controller of a rail vehicle, such as the first locomotive controller 136 of the first locomotive 100 shown in FIG. 2. Additionally, in one example, the fuel container is on a fuel tender, the fuel tender being coupled to the rail vehicle. The controller of the rail vehicle may be referred to herein as the locomotive controller and a controller on the fuel tender may be referred to herein as the tender controller. Further, in one example, the engine of the rail vehicle is a multi fuel engine and the fuel in the fuel container is natural gas. In alternate embodiments, the fuel may be another type of fuel stored in a fuel container and consumed at an engine of a vehicle.

The method begins at 302 by determining operating conditions of the rail vehicle and fuel tender. Operating conditions of the rail vehicle and fuel tender include a speed of the rail vehicle, engine speed and load, a ratio of CNG to alternate fuel consumed at the engine of the rail vehicle, fuel flow from the fuel tender to the engine of the rail vehicle, or the like. At 303, the method includes determining if the rail vehicle is initializing (e.g., starting). For example, if the rail vehicle is starting, or booting up, after a period of inactivity, the rail vehicle may be initializing.

If the rail vehicle is initializing, the method continues on to 304 to receive an initial fuel value measured at the fuel container on the fuel tender. For example, upon initializing, the rail vehicle may request a fuel value measurement from the fuel tender. In one example, the fuel value is a fuel level of the fuel container. In another example, the fuel value is a volume or mass of fuel in the fuel container. As discussed above, in one example, the fuel level is determined using a bubbler method. In some cases, the volume of fuel in the fuel container is determined based on the fuel level and the geometry of the fuel container. In another example, the mass of fuel in the fuel container is determined based on the fuel level, the geometry of the fuel container, and a density of the fuel.

As discussed above, in one example, the fuel tender has its own controller (e.g., tender controller 220 shown in FIGS. 1-2) that determines the fuel value. The tender controller then communicates the determined fuel value to the locomotive controller (e.g., first locomotive controller 136 shown in FIGS. 1-2). For example, the tender controller may communicate the fuel value to the locomotive controller via a network or other wired or wireless connection.

At 305, the method includes storing the initial fuel value received from the fuel tender in the locomotive controller along with a corresponding time stamp. The corresponding time stamp includes a time at which the fuel value is received and stored in the locomotive controller. Storing the fuel value and corresponding time stamp includes storing these values within a memory of the locomotive controller. In this case, the time stamp corresponds to when the rail vehicle was started or initialized. Then, when the locomotive engine begins consuming fuel, the initially stored value is modified based on fuel consumption of the locomotive engine, as discussed further below.

If the rail vehicle is not initializing at 303, the method continues on to 306 to receive a fuel value measured at the fuel container on the fuel tender. As discussed above at 304, the fuel value is one or a fuel level, a fuel volume, or a fuel mass of the fuel container. During rail vehicle operation, the locomotive controller may continually receive fuel values from the tender controller.

At 307, the method includes determining if the rail vehicle speed is less than a threshold speed and/or if the vehicle acceleration is less than a threshold acceleration for a duration. Since the fuel tender is coupled to the rail vehicle, the fuel tender speed and acceleration is substantially the same as the rail vehicle speed and acceleration. In one example, the threshold speed is a speed substantially equal to zero such that the rail vehicle and fuel tender are stationary. In another example, the threshold speed is a speed greater than zero but small enough that fuel level measurements at the fuel container are more accurate compared to when the rail vehicle is traveling at a higher speed. In yet another example, the threshold acceleration is an acceleration substantially equal to zero. The fluid in the fuel container may be substantially stationary at or below the threshold acceleration, thereby resulting in a more accurate fuel level and fuel volume measurement. In one example, the duration is a threshold duration based on an amount of time required for the rail vehicle to be below the threshold speed or threshold acceleration in order to produce a fuel level measurement with a certain percentage accuracy (e.g., 95%). For example, the threshold duration may be 20 seconds. In another example, the threshold duration may be greater or less than 20 seconds. In yet another example, the condition at 307 may include the rail vehicle speed being less than the threshold speed for a first duration and/or the rail vehicle acceleration being less than the threshold acceleration for a second duration. In this example, the second duration is different than the first duration. In one example the first duration may be longer than the second duration. In another example, the second duration may be longer than the first duration. In yet another example, as explained above, the first duration and the second duration may be substantially the same.

If the speed of the rail vehicle and/or the acceleration of the rail vehicle is less than the respective threshold speed and/or acceleration for the threshold duration, the fuel value received from the fuel tender is then stored in the locomotive controller along with a corresponding time stamp at 310. The corresponding time stamp includes a time at which the fuel value is received and stored in the locomotive controller. Storing the fuel value and corresponding time stamp includes storing these values within a memory of the locomotive controller. In this way, a fuel value received from the fuel tender may only be stored in the locomotive controller of the rail vehicle when the rail vehicle speed is less than the threshold for the duration and/or when the rail vehicle acceleration is less than the threshold acceleration for the duration. In some examples, the fuel value may only be stored in the locomotive controller when the rail vehicle is stationary.

At 314, the method includes displaying the fuel value to a rail vehicle operator. At 316, the method includes adjusting vehicle operating conditions based on the fuel value. In some embodiments, the rail vehicle operator may manually adjust vehicle operating conditions responsive to the displayed fuel value. For example, the rail vehicle operator may adjust a stopping location of the rail vehicle in order to refuel the fuel tender if the fuel value is below a threshold fuel value. In one example, at 316 the locomotive controller may adjust an engine notch setting of the rail vehicle based on the fuel value. For example, if the fuel value is below a threshold fuel value, the locomotive controller may reduce the engine notch setting to conserve fuel. In another example, the locomotive controller may send requests to adjust one or more valves in order to adjust an amount of fuel (e.g., CNG) transferred from the fuel tender to the engine of the rail vehicle. For example, an opening of one or more valves, or a fuel pump speed, may be reduced to reduce the amount of fuel transferred to the engine responsive to a fuel value below a threshold fuel value. In yet another example, refueling of the fuel tender may be adjusted based on the fuel value. For example, in response to the fuel value being below a threshold fuel value, the locomotive controller may alert a vehicle operator that refueling of the fuel tender is required. Alternatively or additionally, in response to the fuel value being below the threshold value, the locomotive controller may notify external users through a wireless network that refueling of the fuel tender is required. In other examples, the load of the rail vehicle may be shifted to another locomotive in the consist if the fuel value is below a threshold fuel value.

The method continues on from 316 to loop back to 306 where the locomotive controller receives a fuel value measured at the fuel container on the fuel tender. If the rail vehicle speed or acceleration is at or greater than the respective threshold or the rail vehicle speed or acceleration is not below the respective threshold for the duration, the locomotive controller modifies the fuel value based on fuel consumption at 309, as described further below. The locomotive controller may continuously (e.g., repeatedly) modify the fuel value while the rail vehicle speed is greater than the threshold speed and/or the rail vehicle acceleration is greater than the threshold acceleration. In one example, the locomotive controller may repeatedly modify the fuel value every 10 seconds during rail vehicle operation at or above the threshold speed and/or threshold acceleration. In another example, the locomotive may modify the fuel value after a period of less than or greater than 10 seconds. In this way the locomotive controller may modify the fuel value at a determined frequency, the modifying based on fuel consumption while the rail vehicle speed is less than the threshold speed and/or the rail vehicle acceleration is less than the threshold acceleration. As the locomotive controller continuously modifies the fuel value at the determined frequency, the updated modified fuel value may then be displayed to the vehicle operator (as described at 314). Thus, the displayed fuel value may change at a similar frequency as the modifying frequency.

However, if the rail vehicle speed is less than the threshold speed or the rail vehicle acceleration is less than the threshold acceleration for the duration, the method returns to 310 to store the most recent fuel value received from the fuel tender, along with a new corresponding time stamp. In this way, the initially stored fuel value is updated with a newly measured fuel value.

Returning to 307, if the rail vehicle speed and/or rail vehicle acceleration is not less than the threshold speed or threshold acceleration for the threshold duration, the fuel value is not stored in the locomotive controller of the rail vehicle at 308. In some examples, the locomotive controller may continuously receive fuel values from the fuel tender. However, if the rail vehicle is moving faster than the threshold speed, accelerating faster than the threshold acceleration, or moving below the threshold speed or acceleration for less than the threshold duration, the fuel values are not stored in the locomotive controller. In one example, when the rail vehicle is moving faster than the threshold speed and/or the rail vehicle is accelerating faster than the threshold acceleration, a current fuel value stored in the locomotive controller is not modified or updated based on the newly sent fuel value.

Then, at 309, the method includes modifying the last stored or modified fuel value in the locomotive controller based on fuel consumption of the rail vehicle. Modifying the stored, initial fuel value includes subtracting an amount of fuel (e.g., natural gas fuel) consumed by the engine of the rail vehicle since a time of storing the initial fuel value (e.g., based on the time stamp) from the initial fuel value. In one example, the amount of fuel consumed is based on a pre-determined fuel efficiency value of the engine of the rail vehicle. For example, the fuel efficiency value may include a miles/gallon estimate. The amount of fuel consumed may then be determined based on the fuel efficiency value, a number of miles traveled since the time stamp of the initial fuel value, and a percentage or ratio of CNG to alternate fuel consumed by the engine.

In another example, the amount of fuel consumed is based on a flow rate of fuel (e.g., CNG) flowing from the fuel tender, into the rail vehicle, and to the engine. In this example, the amount of fuel consumed is further based on a temperature and pressure of the fuel. Specifically, the flow rate, temperature, and pressure of the fuel may be used to determine a mass of fuel sent to the engine. In some examples, the mass of fuel may be converted to a volume of fuel which may then be subtracted from the initial fuel value.

In yet another example, the amount of fuel consumed is based on a total amount of energy in engine cylinders, an energy contribution of natural gas in the engine cylinders, and an energy value of natural gas. For example, a total amount of energy in the cylinders of the engine of the rail vehicle may be known. By knowing an energy density or energy value of the natural gas, along with an energy contribution of the natural gas in the engine cylinders (e.g., ratio or percentage of natural gas to alternate fuel), the locomotive controller may determine the amount of fuel (e.g., natural gas) consumed at the engine. In another example, the amount of fuel consumed is based on a locomotive efficiency estimate that is based on a mass of fuel consumed vs. energy created by an alternator of the locomotive engine.

The determined amount of fuel consumed by the engine of the rail vehicle is then subtracted from the initial fuel value to determine the modified fuel value. After modifying the fuel value at 309, the method then continues on from 309 to 314 to display the modified fuel value to the rail vehicle operator. Then, at 316 the method includes adjusting vehicle operating conditions based on the modified fuel value, as described above.

In this way, a method includes storing an initial fuel volume measurement for a fuel container of a first rail vehicle and modifying the initial fuel volume measurement based on fuel consumption of an engine of a second rail vehicle to determine a modified fuel volume. The second rail vehicle is coupled to the first rail vehicle. In one example, the initial fuel volume measurement is based on a pressure of a column of fuel in the fuel container. Additionally, in one example, the first rail vehicle is a fuel tender and the second rail vehicle is a locomotive. Further, the locomotive is in communication with the fuel tender and the fuel tender is coupled to the locomotive.

Storing the initial fuel volume measurement includes receiving the initial fuel volume measurement from the first rail vehicle and storing the initial fuel volume measurement in a controller of the second rail vehicle. In one example, the initial fuel volume measurement is stored when the second rail vehicle is stationary for a duration. In another example, the initial fuel volume measurement is stored when one or more of a speed of the second rail vehicle is less than a threshold speed for a duration or an acceleration of the second rail vehicle is less than a threshold acceleration for the duration. The method further includes receiving a fuel volume measurement from the first rail vehicle and not storing the fuel volume measurement when one or more of a speed of the second rail vehicle is greater than a threshold speed or an acceleration of the second rail vehicle is greater than a threshold acceleration.

Modifying the initial fuel volume measurement includes subtracting an amount of fuel consumed by the engine of the second rail vehicle since a time of the initial fuel volume measurement from the initial fuel volume measurement. In one example, the fuel is natural gas. In a first example, the amount of fuel consumed is based on a pre-determined fuel efficiency value of the engine of the second rail vehicle. In a second example, the amount of fuel consumed is based on a flow rate of fuel flowing into the second rail vehicle and to the engine, a temperature of the fuel, and a pressure of the fuel. In a third example, the amount of fuel consumed is based on a total amount of energy in engine cylinders, an energy contribution of natural gas in the engine cylinders, and an energy value of natural gas.

The method further includes displaying the modified fuel volume to an operator of the second rail vehicle. Additionally, the method includes adjusting one or more of an engine notch setting of the second rail vehicle, an amount of fuel transferred from the first rail vehicle to the engine of the second rail vehicle, and refueling of the second rail vehicle responsive to the modified fuel volume.

FIG. 4 shows a graphical example of storing a fuel volume received from a fuel tender and modifying the stored fuel volume based on fuel consumption of a locomotive engine. Specifically, graph 400 shows changes in speed of a rail vehicle at plot 402, changes in a stored fuel volume at plot 404, changes in a modified fuel volume at plot 406, and changes in fuel consumption of the locomotive engine at plot 408. As discussed above, a fuel tender including a fuel container may be coupled to a rail vehicle (e.g., locomotive). The rail vehicle includes a locomotive controller which receives fuel volume measurements from the fuel tender, the fuel volume measurements corresponding to the volume of fuel in the fuel container. In alternate examples, the locomotive controller may receive another type of fuel value such as a fuel level or fuel mass of the fuel container. In one example, the fuel container holds LNG and the locomotive engine consumes CNG transferred from the fuel tender to the rail vehicle. CNG fuel consumption of the locomotive engine on the rail vehicle is then used to modify the fuel volume stored in the locomotive controller. Further, graph 400 shows storing and modifying the fuel volume based on rail vehicle speed in relation to a threshold speed. However, in alternate embodiments, storing and modifying the fuel volume measurements received at the locomotive controller may be based additionally or alternatively on rail vehicle acceleration in relation to a threshold acceleration.

Prior to time t1, the rail vehicle is traveling at a speed greater than zero (plot 402). Also before time t1, an initial fuel volume is stored in the locomotive controller. At time t1, the rail vehicle speed decreases to substantially zero, thereby indicating that the rail vehicle is stationary (plot 402). Thus, in this example, the threshold speed is zero. However, in alternate examples, the threshold speed may be a speed greater than zero. After a threshold duration, d1, a fuel volume received at the locomotive controller from the fuel tender is stored within the locomotive controller (plot 404). As seen at plot 404, the stored fuel volume (or value) at time t2 is smaller than the initially stored fuel value prior to time t1.

At time t3, the rail vehicle begins moving again, as illustrated by an increase in rail vehicle speed (plot 402). As the rail vehicle tractive effort increases and the locomotive engine operates, fuel consumption of the locomotive engine increases (plot 408). As a result, after time t3, the stored fuel volume is modified based on fuel consumption to determine a modified fuel volume (plot 406). The modified fuel volume is equal to the stored fuel volume at time t3 and decreases based on fuel consumption thereafter (plot 406). During the time between time t3 and time t4, fuel volume measurements may continue to be sent from the tender controller to the locomotive controller. However, since the rail vehicle is moving at a speed above the threshold speed, the fuel volumes are not stored in the locomotive controller. Said another way, the stored fuel volume is not updated between time t3 and time t4 since the rail vehicle speed is above the threshold speed.

At time t4, the rail vehicle speed decreases below the threshold speed and is substantially zero (plot 402). Fuel consumption also decreases as the rail vehicle speed decreases and the engine stops consuming fuel (plot 408). As a result, the modified fuel volume remains relatively constant (plot 406). After the rail vehicle speed is substantially zero for the threshold duration d1, the stored fuel volume is updated at time t5. As seen at plot 404, the updated stored fuel volume is less than the previously stored fuel volume. Also, in some cases, as shown at FIG. 4, the updated stored fuel volume at time t5 is slightly different than the modified fuel volume just before time t5. Since the modified fuel volume is an estimated value, the stored fuel volume received from the fuel tender may represent a more accurate fuel volume value. As such, the updated stored fuel volume is modified after time t5, once the rail vehicle begins moving again.

As illustrated at FIG. 4, a method includes receiving a fuel volume determined at a fuel container on a fuel tender and storing the fuel volume in a controller of a rail vehicle when the rail vehicle is stationary for a duration (as shown at time t2), the rail vehicle coupled to the fuel tender. As shown between time t3 and time t4, the method further includes repeatedly modifying the fuel volume based on fuel consumption of an engine of the rail vehicle to determine a modified fuel volume. The method may then include displaying the modified fuel volume to a rail vehicle operator. In one example, repeatedly modifying the fuel volume includes continuously modifying the fuel volume while the rail vehicle is moving. As shown at time t5, the method further includes subsequently updating the fuel volume stored in the controller when the vehicle is again stationary for the duration.

In this way, a fuel volume of a fuel container may be modified based on fuel consumption of an engine of a rail vehicle. As discussed above, liquid natural gas (LNG) may be stored in a fuel container on a fuel tender, the fuel tender coupled to the rail vehicle. In one example, the rail vehicle is a locomotive with a locomotive engine and locomotive controller. The LNG may then be converted to gaseous natural gas (CNG) and transferred to the rail vehicle to be consumed at the locomotive engine. A tender controller may continuously send fuel volume measurements to the locomotive controller. However, the fuel volume measurements may only be stored in the locomotive controller when the rail vehicle is stationary for a duration or the acceleration of the rail vehicle is below a threshold acceleration. When the rail vehicle is moving or accelerating above the threshold acceleration, the stored fuel volume measurement may then be modified based on CNG fuel consumption of the locomotive engine to determine a modified fuel volume. In one example, engine and/or vehicle operating conditions may be adjusted based on the modified fuel volume. In this way, an estimation of the fuel volume in the fuel container may be determined while the rail vehicle is moving. Further, the fuel volume estimate (e.g., modified fuel volume) may be more accurate than the fuel volume measurement sent from the fuel tender while the rail vehicle is moving. As a result, fuel tender fueling and locomotive engine operation may be optimized based on the modified fuel volume.

An embodiment relates to a method comprising storing an initial fuel volume measurement for a fuel container of a first rail vehicle, and modifying the initial fuel volume measurement based on fuel consumption of an engine of a second rail vehicle, to determine a modified fuel volume. The first rail vehicle may be coupled to the second rail vehicle, e.g., the first rail vehicle may be a fuel tender and the second rail vehicle may be a locomotive in communication with the fuel tender. Additionally, the fuel may be natural gas.

In another embodiment of the method, storing the initial fuel volume measurement includes receiving the initial fuel volume measurement from the first rail vehicle and storing the initial fuel volume measurement in a controller of the second rail vehicle.

In another embodiment of the method, the initial fuel volume measurement is stored when one or more of a speed of the second rail vehicle is less than a threshold speed for a first duration or an acceleration of the second rail vehicle is less than a threshold acceleration for the first duration or a second duration. For example, the initial fuel volume measurement may be stored responsive to the speed of the second rail vehicle being less than the threshold speed for the first duration, and/or responsive to an acceleration of the second rail vehicle being less than the threshold acceleration for the first duration or the second duration.

In another embodiment of the method, the method further comprises displaying the modified fuel volume to an operator of the second rail vehicle.

In another embodiment of the method, modifying the initial fuel volume measurement includes subtracting from the initial fuel volume measurement a determined amount of fuel consumed by the engine of the second rail vehicle since a time of the initial fuel volume measurement.

In another embodiment of the method, the determined amount of fuel consumed is based on a pre-determined fuel efficiency value of the engine of the second rail vehicle.

In another embodiment of the method, the determined amount of fuel consumed is based on a flow rate of fuel flowing into the second rail vehicle and to the engine, a temperature of the fuel, and a pressure of the fuel.

In another embodiment of the method, the determined amount of fuel consumed is based on a total amount of energy in engine cylinders, an energy contribution of natural gas in the engine cylinders, and an energy value of natural gas.

In another embodiment of the method, the initial fuel volume measurement is based on a pressure of a column of fuel in the fuel container.

In another embodiment of the method, the method further comprises receiving a fuel volume measurement from the first rail vehicle and not storing the fuel volume measurement when one or more of a speed of the second rail vehicle is greater than a threshold speed or an acceleration of the second rail vehicle is greater than a threshold acceleration.

In another embodiment of the method, the method further comprises adjusting one or more of an engine notch setting of the second rail vehicle, an amount of fuel transferred from the first rail vehicle to the engine of the second rail vehicle, or refueling of the second rail vehicle responsive to the modified fuel volume.

In another embodiment, a method comprises receiving a fuel value measured at a fuel container on a fuel tender, storing the fuel value and a corresponding time stamp when a speed of a rail vehicle is at or below a threshold speed for a duration, and modifying the fuel value based on fuel consumption of an engine of the rail vehicle to determine a modified fuel value. For example, the fuel value and corresponding time stamp may be stored responsive to the speed of the rail vehicle being at or below the threshold speed for a designated duration of time.

In another embodiment of the method, storing the fuel value and the corresponding time stamp includes storing the fuel value and a time at which the fuel value is received within a memory of a controller of the rail vehicle.

In another embodiment of the method, the fuel value stored in the controller is an initial fuel value, and the method further comprises updating the initial fuel value stored in the controller when the speed of the rail vehicle decreases below the threshold speed for the duration.

In another embodiment of the method, the threshold speed is the rail vehicle being stopped (zero velocity), and thereby the fuel value is stored when the fuel value is received at a time when the rail vehicle is stopped. Modifying the fuel value includes modifying the fuel value stored in a controller of the rail vehicle after the rail vehicle is re-started.

In another embodiment of the method, the method further comprises displaying the modified fuel value to an operator of the rail vehicle.

In another embodiment of the method, the fuel value is one or more of a fuel level or an amount of fuel in the fuel container, the amount of fuel based on the fuel level and a geometry of the fuel container and the amount of fuel being one or more of a volume of fuel or a mass of fuel in the fuel container.

In another embodiment of the method, modifying the fuel value based on fuel consumption includes subtracting from the fuel value a mass of fuel consumed by the engine since the time stamp. The mass of fuel consumed by the engine is based on one or more of a fuel efficiency of the rail vehicle, the speed of the rail vehicle, a flow rate of fuel from the fuel container and into the engine, a total amount of energy in engine cylinders, or an energy contribution of natural gas in the engine cylinders.

In another embodiment, a method comprises receiving a fuel volume determined at a fuel container on a fuel tender, storing the fuel volume in a controller of a rail vehicle when the rail vehicle is stationary for a duration (the rail vehicle being coupled to the fuel tender), repeatedly modifying the fuel volume based on fuel consumption of an engine of the rail vehicle to determine a modified fuel volume, and displaying the modified fuel volume to a rail vehicle operator and/or automatically controlling at least one of the rail vehicle or the fuel tender based on the modified fuel volume. Automatic control may include modifying operation of the engine, modifying operation of how fuel is supplied to the rail vehicle from the fuel tender, or the like.

In another embodiment of the method, repeatedly modifying the fuel volume includes continuously modifying the fuel volume while the rail vehicle is moving, and the method further comprises subsequently updating the fuel volume stored in the controller when the rail vehicle is again stationary for the duration.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    storing an initial fuel volume measurement for a fuel container of a first vehicle;
    modifying the initial fuel volume measurement based on fuel consumption of an engine of a second vehicle to determine a modified fuel volume; and
    adjusting one or more of an engine throttle setting of the second vehicle, an amount of fuel transferred from the first vehicle to the engine of the second vehicle, or refueling of the second vehicle responsive to the modified initial fuel volume.

2. The method of claim 1, wherein storing the initial fuel volume measurement includes receiving the initial fuel volume measurement from the first vehicle and storing the initial fuel volume measurement in a controller of the second vehicle.

3. The method of claim 2, wherein the initial fuel volume measurement is stored when one or more of a speed of the second vehicle is less than a threshold speed for a first duration or an acceleration of the second vehicle is less than a threshold acceleration for the first duration or a second duration, and wherein the first vehicle is a first rail vehicle and the second vehicle is a second rail vehicle, the second rail vehicle coupled to the first rail vehicle.

4. The method of claim 1, further comprising displaying the modified initial fuel volume to an operator of the second vehicle.

5. The method of claim 1, wherein the modifying the initial fuel volume measurement includes subtracting from the initial fuel volume measurement a determined amount of fuel consumed by the engine of the second vehicle since a time of the initial fuel volume measurement, and wherein the fuel is natural gas.

6. The method of claim 5, wherein the determined amount of fuel consumed is based on a pre-determined fuel efficiency value of the engine of the second vehicle.

7. The method of claim 5, wherein the determined amount of fuel consumed is based on a flow rate of fuel flowing into the second vehicle and to the engine, a temperature of the fuel, and a pressure of the fuel.

8. The method of claim 5, wherein the determined amount of fuel consumed is based on a total amount of energy in engine cylinders, an energy contribution of natural gas in the engine cylinders, and an energy value of natural gas.

9. The method of claim 1, wherein the initial fuel volume measurement is based on a pressure of a column of fuel in the fuel container, wherein the first vehicle is a fuel tender and the second vehicle is a locomotive, and wherein the locomotive is in communication with the fuel tender.

10. The method of claim 1, further comprising receiving a fuel volume measurement from the first vehicle and not storing the fuel volume measurement when one or more of a speed of the second vehicle is greater than a threshold speed or an acceleration of the second vehicle is greater than a threshold acceleration.

11. The method of claim 1, wherein adjusting the engine throttle setting of the second vehicle includes if the modified initial fuel volume is below a threshold fuel value, reducing the engine throttle setting of the second vehicle.

12. A method, comprising:
    receiving a fuel value measured at a fuel container on a fuel tender;
    storing the fuel value and a corresponding time stamp when a speed of a rail vehicle is below a threshold speed for a duration; and
    modifying the fuel value based on fuel consumption of an engine of the rail vehicle to determine a modified fuel value.

13. The method of claim 12, wherein storing the fuel value and the corresponding time stamp includes storing the fuel value and a time at which the fuel value is received within a memory of a controller of the rail vehicle.

14. The method of claim 13, wherein the fuel value stored in the controller is an initial fuel value and further comprising updating the initial fuel value stored in the controller when the speed of the rail vehicle decreases below the threshold speed for the duration.

15. The method of claim 12, wherein storing the fuel value comprises storing the fuel value when the fuel value is received at a time when the rail vehicle is stopped, and wherein modifying the fuel value includes modifying the fuel value stored in a controller of the rail vehicle after the rail vehicle is re-started.

16. The method of claim 12, further comprising displaying the modified fuel value to an operator of the rail vehicle.

17. The method of claim 12, wherein the fuel value is one or more of a fuel level or an amount of fuel in the fuel container, the amount of fuel based on the fuel level and a geometry of the fuel container and the amount of fuel being one or more of a volume of fuel or a mass of fuel in the fuel container.

18. The method of claim 12, wherein modifying the fuel value based on fuel consumption includes subtracting from the fuel value a mass of fuel consumed by the engine since the time stamp, and wherein the mass of fuel consumed by the engine is based on one or more of a fuel efficiency of the rail vehicle, the speed of the rail vehicle, a flow rate of fuel from the fuel container and into the engine, a total amount of energy in engine cylinders, or an energy contribution of natural gas in the engine cylinders.

19. A method, comprising
receiving a fuel volume determined at a fuel container on a fuel tender;
storing the fuel volume in a controller of a rail vehicle when the rail vehicle is stationary for a duration, the rail vehicle coupled to the fuel tender;
repeatedly modifying the fuel volume based on fuel consumption of an engine of the rail vehicle to determine a modified fuel volume; and
at least one of displaying the modified fuel volume to a rail vehicle operator or automatically controlling at least one of the rail vehicle or the fuel tender based on the modified fuel volume.

20. The method of claim 19, wherein the repeatedly modifying the fuel volume includes continuously modifying the fuel volume while the rail vehicle is moving and further comprising subsequently updating the fuel volume stored in the controller when the rail vehicle is again stationary for the duration.

* * * * *